(12) United States Patent
Wiborg

(10) Patent No.: US 7,399,004 B2
(45) Date of Patent: Jul. 15, 2008

(54) UNIVERSAL ATTACHMENT FOR CAPTURING AND UTILIZING EXHAUST GAS FROM PNEUMATIC POWER TOOLS

(76) Inventor: Lance W. Wiborg, 27105-625th Ave., P.O. Box 496, Gibbon, MN (US) 55335

( * ) Notice: Subject to any disclaimer, the term of this patent is extended or adjusted under 35 U.S.C. 154(b) by 200 days.

(21) Appl. No.: 11/197,164

(22) Filed: Aug. 3, 2005

(65) Prior Publication Data

US 2005/0264008 A1 Dec. 1, 2005

Related U.S. Application Data

(63) Continuation-in-part of application No. 10/259,876, filed on Sep. 26, 2002, now abandoned.

(51) Int. Cl.
*F16L 37/00* (2006.01)
(52) U.S. Cl. .................. 285/316; 285/190; 285/277
(58) Field of Classification Search ............... 285/316, 285/315, 314, 190, 277, 276; 173/146, 74, 173/75, 198
See application file for complete search history.

(56) References Cited

U.S. PATENT DOCUMENTS

| | | | |
|---|---|---|---|
| 2,730,382 A * | 1/1956 | De Mastri ................ 285/277 |
| 2,935,338 A * | 5/1960 | Mills, Jr. ................. 285/277 |
| 3,097,867 A * | 7/1963 | Saloum ................... 285/277 |
| 3,177,018 A * | 4/1965 | Goodwin ................. 285/277 |
| 3,638,737 A | 2/1972 | Moates |
| 4,192,390 A | 3/1980 | Wanner et al. |
| 4,281,457 A | 8/1981 | Walton, II |
| 4,361,957 A | 12/1982 | Krotz et al. |
| 5,031,364 A | 7/1991 | Belanger |
| 5,228,244 A | 7/1993 | Chu |
| 5,591,070 A | 1/1997 | Kacich |
| 5,722,111 A | 3/1998 | Sowell, et al. |
| 5,772,367 A | 6/1998 | Daniel |
| 5,800,171 A | 9/1998 | Barney |
| 5,919,010 A | 7/1999 | Fonseca |
| 6,049,941 A | 4/2000 | Vollenweider, II |
| 6,149,511 A | 11/2000 | Huber |
| 6,170,758 B1 | 1/2001 | Lee |
| 6,196,331 B1 | 3/2001 | Naito et al. |

* cited by examiner

*Primary Examiner*—David E Bochna
(74) *Attorney, Agent, or Firm*—Walter K. Roloff

(57) ABSTRACT

A universal attachment for capturing and utilizing exhaust gas from pneumatic power tools having a conventional pressurized gas line connection and a conventional exhaust gas port, includes an inner sleeve member having at least one exhaust outlet and being configured to accommodate a conventional gas line assembly there within. An outer sleeve member is configured to accommodate the inner sleeve member there within. At least one spring is disposed between the inner sleeve member and the outer sleeve member. In use with a pneumatic power tool, the outer sleeve member is securely held against the tool by way of coupling the conventional gas line assembly, placed within the inner sleeve member, to the conventional pressurized gas line connection of the tool. In this manner, the outer sleeve member encompasses the conventional exhaust gas port of the tool such that exhaust gas from the tool is blown (i) through the outer sleeve member, (ii) through the inner sleeve member, and finally (iii) out from the exhaust outlet of the inner sleeve member, thereby harnessing the exhaust gas for a desired secondary function.

6 Claims, 6 Drawing Sheets

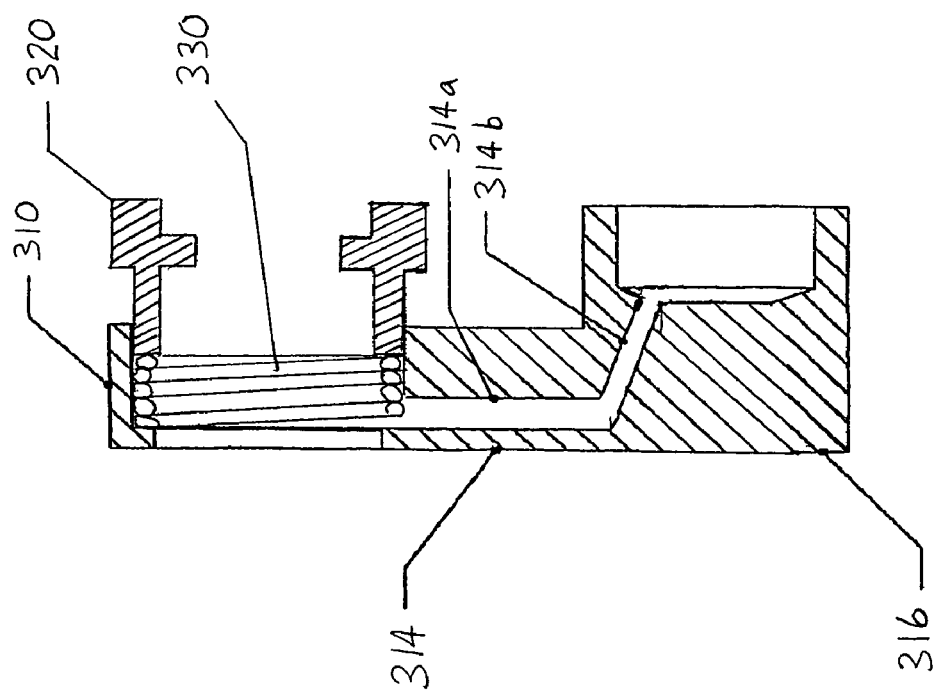
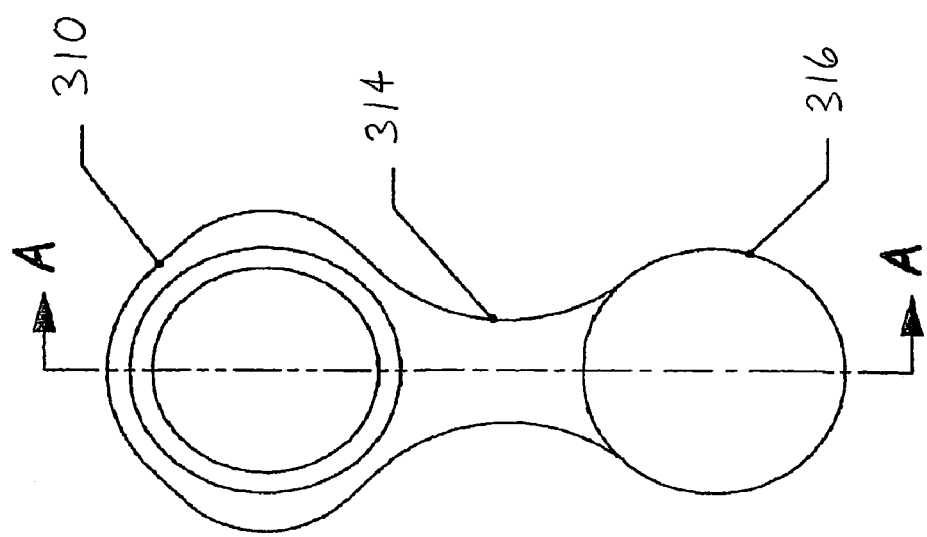

UNIVERSAL ATTACHMENT FOR CAPTURING AND UTILIZING EXHAUST GAS FROM PNEUMATIC POWER TOOLS

CROSS REFERENCE TO RELATED APPLICATION

The present application is a continuation-in-part of non-provisional application Ser. No. 10/259,876 filed on Sep. 26, 2002 now abandoned, the entirety thereof being incorporated herein by reference thereto.

FIELD OF THE INVENTION

The present invention relates generally to power tools. The invention relates specifically to a universal attachment for capturing and utilizing exhaust gas from pneumatic power tools.

BACKGROUND OF THE INVENTION

Pneumatic power tools are well known, and have enjoyed wide commercial success. These power tools are commonly used for light industrial operations, such as grinding, drilling, "nibbling", shaving, sawing, hammering, and the like. As used here throughout, the term "pneumatic" is intended to include compressed air or any suitable gas that is capable of being compressed or otherwise pressurized to, in turn, drive a pneumatic power tool as is well known.

Operation of pneumatic power tools can create noise, particulates, dust, and other debris, which can be bothersome or even extremely harmful to an operator of the tool and to other nearby persons and machines. Commonly, devices such as mufflers, blowers, and vacuums are employed around a work area where a pneumatic power tool is in use, for suppressing noise, blowing debris from a work piece or fixture, or removing debris from such areas, respectively. The devices typically require a remote source or additional means to power them. Also, such devices commonly require separate manipulation and operation, by a user, from the pneumatic power tool. In order to alleviate the requirement of a remote power source and also separate manipulation of a muffler, blower, vacuum, or other desired device (hereinafter, alone or in any combination, "secondary function" devices) several means have been proposed to combine the tool operation and the secondary function in one overall system.

For example, in U.S. Pat. No. 3,638,737 issued to Moates, a pneumatic drill or "jackhammer" includes a conduit attachment enclosed by a tube of sound absorbing material, that channels exhaust air therethrough to muffle noise produced by the exhaust air. The exhaust air flow creates a vacuum effect, which may be used to draw dust and small debris out through a discharge opening. A separate source of compressed air may be employed, to create an increased vacuum effect.

In U.S. Pat. No. 4,192,390 issued to Wanner, et al., a power tool includes a blower mounted on an output shaft of a motor driving the tool. The blower acts to collect particulate matter resulting from operation of the tool.

U.S. Pat. No. 4,281,457 issued to Walton, II, discloses a vacuum-operated tool for cutting plaster casts. The tool employs a turbine impeller mechanism that rotates in response to a vacuum-induced flow. A saw blade is coupled to the impeller mechanism and is driven thereby. Ambient air drawn into the tool by the vacuum-induced flow entrains and removes particulates resulting from operation of the tool on a cast.

In U.S. Pat. No. 4,361,957 issued to Krötz, et al., a pneumatic hand tool has an exhaust port that is connected to an exhaust fitting, including a venturi and a vacuum chamber. The vacuum chamber is connected, in turn, to a removable suction pick-up nozzle. In operation, air exhausted from the tool at the exhaust port creates a vacuum by way of the exhaust fitting. The vacuum acts through the suction pick-up nozzle to collect debris created by the tool. The exhaust fitting, or injection nozzle, together with the venturi, can be in the form of an attachment arranged for screw connection to the exhaust port of the tool.

U.S. Pat. No. 5,031,364 issued to Belanger discloses a tool for cutting a protruding pintail of a set fastener. The tool includes a vacuum system for collecting severed pintails. The vacuum system comprises an impeller connected to an output shaft of the tool, to create a partial vacuum for collecting the pintails.

In U.S. Pat. No. 5,228,244 issued to Chu, a pneumatic tool includes a venturi tube portion formed in a side portion of the tool for directing an exhaust air stream from the tool. The directed exhaust air stream from the venturi acts to remove dust produced by the tool.

U.S. Pat. No. 5,772,367 issued to Daniel discloses an attachment for a rotating tool bit. The attachment provides air flow in a vicinity of a work area without need for separate vacuum or compressed air supplies.

In U.S. Pat. No. 6,049,941 issued to Vollenweider, II, a portable vacuum system is powered by a pressurized air supply, which is also used to power a connected tool. A venturi device generates a vacuum from the pressurized air supply. By way of selectable valves, an operator can separately control the supply of pressurized air to the vacuum system and the tool.

U.S. Pat. No. 6,149,511 issued to Huber discloses exclusively a random orbital sander and in one embodiment a "self-generated vacuum random orbital sander" (col. 8, lines 19-28). This complicated device utilizes a non-universal, tool-specific, and importantly, threaded apparatus, for the intended lone vacuuming function.

Finally, U.S. Pat. No. 6,170,758 issued to Lee discloses a multi-functional air gun that uses a single compressed air supply to selectively perform a vacuum operation, a blowing operation, or both operations simultaneously.

For the most part, however, the aforementioned patents and other devices known in the art are generally elaborate and specifically constructed mechanisms that can only be employed in tool-specific embodiments, and which perhaps even more importantly appear to be model-specific.

Therefore, there exists a need for a universal attachment for capturing and utilizing exhaust gas from pneumatic power tools which (i) overcomes the drawbacks of the known devices, (ii) provides a wide variety of secondary functions, (ii) provides great versatility and interchangeability in application, and (iii) is easy to use.

SUMMARY OF THE INVENTION

An object of the present invention is to provide a universal attachment for capturing and utilizing exhaust gas from pneumatic power tools that harnesses energy from such tools that would otherwise be expended.

Another object of the present invention is to provide a universal attachment for capturing and utilizing exhaust gas from pneumatic power tools that does not require the use of elaborate and specifically constructed mechanisms.

An additional object of the present invention is to provide a universal attachment for capturing and utilizing exhaust gas from pneumatic power tools which overcomes the drawbacks of known devices.

A further object of the present invention is to provide a universal attachment for capturing and utilizing exhaust gas from pneumatic power tools which provides great versatility and interchangeability in application, and which is easy to use.

In accordance with the present invention a universal attachment for capturing and utilizing exhaust gas from pneumatic power tools having a conventional pressurized gas line connection and a conventional exhaust gas port, includes an inner sleeve member having at least one exhaust outlet and being configured to accommodate a conventional gas line assembly there within. An outer sleeve member is configured to accommodate the inner sleeve member there within. At least one spring is disposed between the inner sleeve member and the outer sleeve member. In use with a pneumatic power tool, the outer sleeve member is securely held against the tool by way of coupling the conventional gas line assembly, placed within the inner sleeve member, to the conventional pressurized gas line connection of the tool. In this manner, the outer sleeve member encompasses the conventional exhaust gas port of the tool such that exhaust gas from the tool is blown (i) through the outer sleeve member, (ii) through the inner sleeve member, and finally (iii) out from the exhaust outlet of the inner sleeve member, thereby harnessing the exhaust gas for a desired secondary function.

BRIEF DESCRIPTION OF THE DRAWINGS

FIG. 5 is a front view illustration of a housing component of the invention depicted in FIGS. 3 and 4.

FIG. 6 is a cross-sectional illustration of the invention, taken along line A-A in FIG. 5.

DETAILED DESCRIPTION OF THE INVENTION

Figure 1:
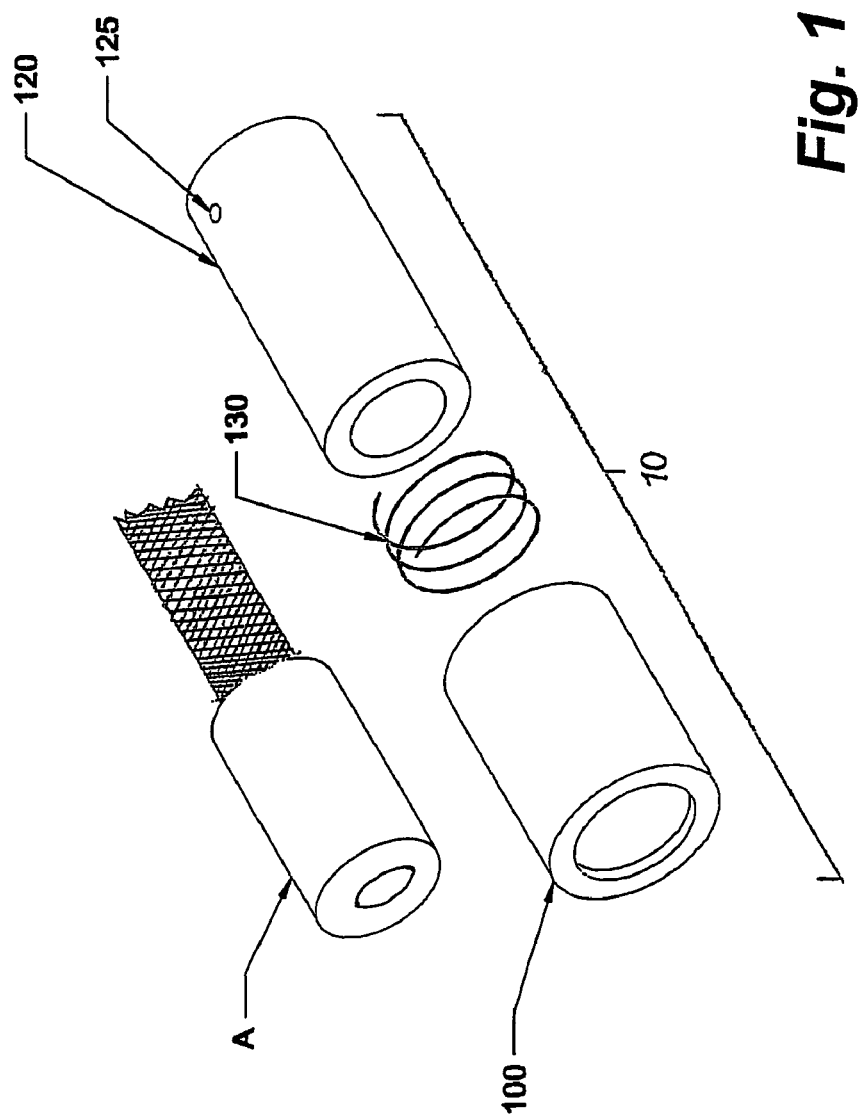
FIG. 1 is a perspective illustration of a universal attachment for capturing and utilizing exhaust gas from pneumatic power tools, constructed in accordance with the present invention.
Figure 2:
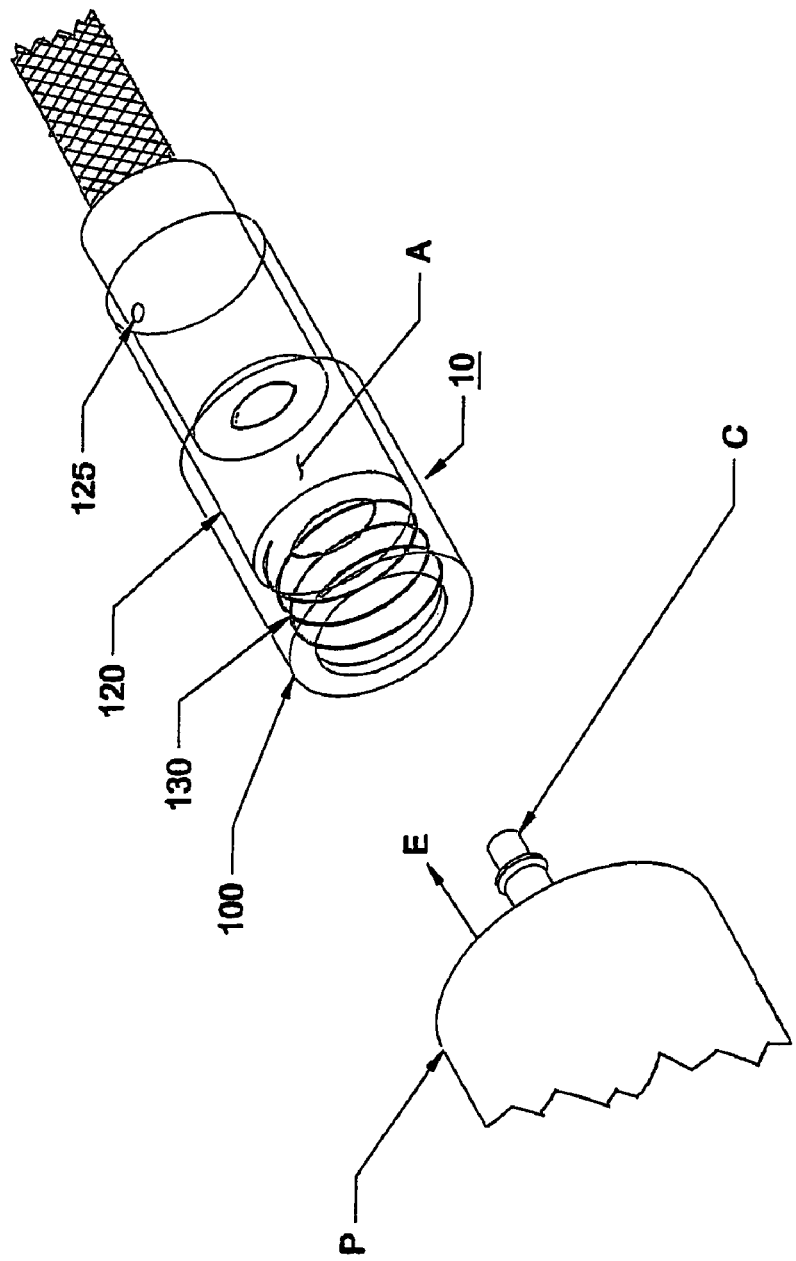
FIG. 2 is a semi-transparent illustration of the invention as depicted in FIG. 1, being prepared for use.

Referring to FIGS. 1 and 2, there shown is a universal attachment for capturing and utilizing exhaust gas from pneumatic power tools 10 ("attachment 10"). Attachment 10 comprises an outer sleeve member 100, an inner sleeve member 120, and a spring 130.

Outer sleeve member 100 is capable of connection to an exhaust port of a pneumatic power tool P such that exhaust gas E from the tool is captured therewithin. Members 100 and 120 also provide access for coupling a conventional gas supply line assembly A to a conventional air supply coupling C of the tool. Exhaust gas outflow portion 125 is capable of connection to a secondary function device (not illustrated) providing a functions including but not limited to blowing, audibly muffling, or vacuuming, alone or in any combination as may be desired.

The components of attachment 10 may be fabricated from any suitably durable materials, such as aluminum, brass, or any desired metal, or from a suitable stock plastic-like material such as, for example, MAKROBLEND ® UT403 from Bayer Polymers. Such plastic-like material may be a polycarbonate/polyethylene blend that is UV stabilized, providing suitable impact resistance and chemical/oil resistance. Further, the UV stability of this preferred material inhibits fading and degradation over time.

In FIG. 2, it may be seen that upon connection of gas supply line assembly A to coupling C in a conventional manner, assembly A forcibly abuts an interior front surface of inner sleeve member 120. In turn, member 120 compresses spring 130, which acts to secure outer sleeve member 100 to the tool. It is to be particularly understood that member 100, in concentric cooperation with spring 130 and telescoping inner sleeve member 120, together provide a universal and substantially airtight connection between member 100 of attachment 10 among pneumatic power tools having couplings C of various lengths and other dimensions.

Spring 130 may be any suitable wire spring that is operable within, for example, a 1.5 in. bore, and having a linear working range of about 0.1875 in. to 0.75 in. Spring 330 also has, for example, a wire diameter range of about 0.08-0.09 in.

As a stream of exhaust gas E from the tool in operation flows from its exhaust port, outer sleeve member 100 acts to collect and confine the stream of exhaust gas E. Sufficient pressure then builds therein to force the exhaust gas E into inner sleeve member 120. The relatively pressurized stream of gas E is then forcibly blown from exhaust gas outflow portion 125 into a secondary function device (not illustrated) capable of being coupled thereto.

Figure 3:
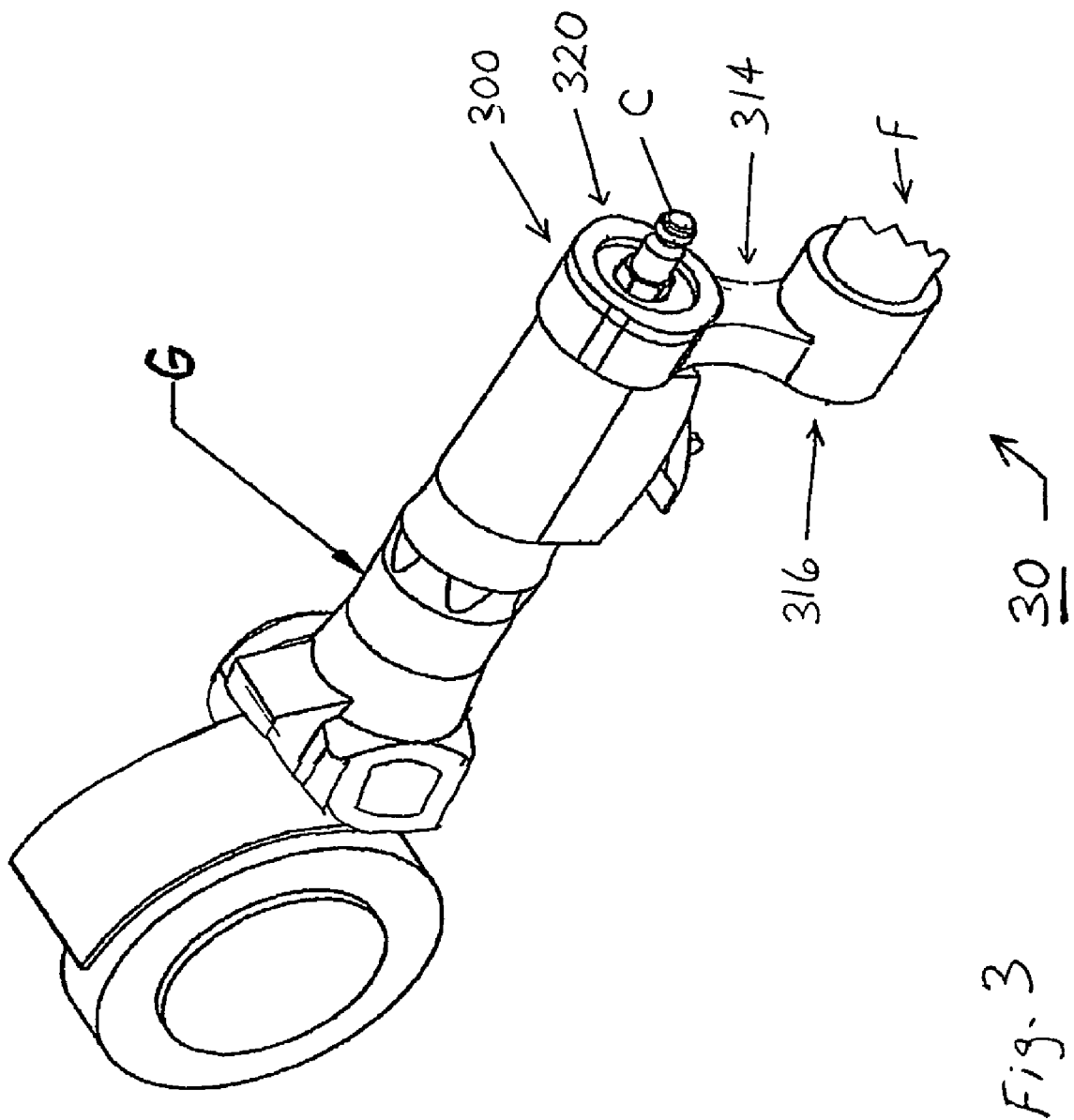
FIG. 3 is a perspective illustration of an alternative embodiment of a universal attachment for capturing and utilizing exhaust gas from pneumatic power tools, constructed in accordance with the present invention and shown as being coupled to an exemplary pneumatic power tool.
Figure 4:
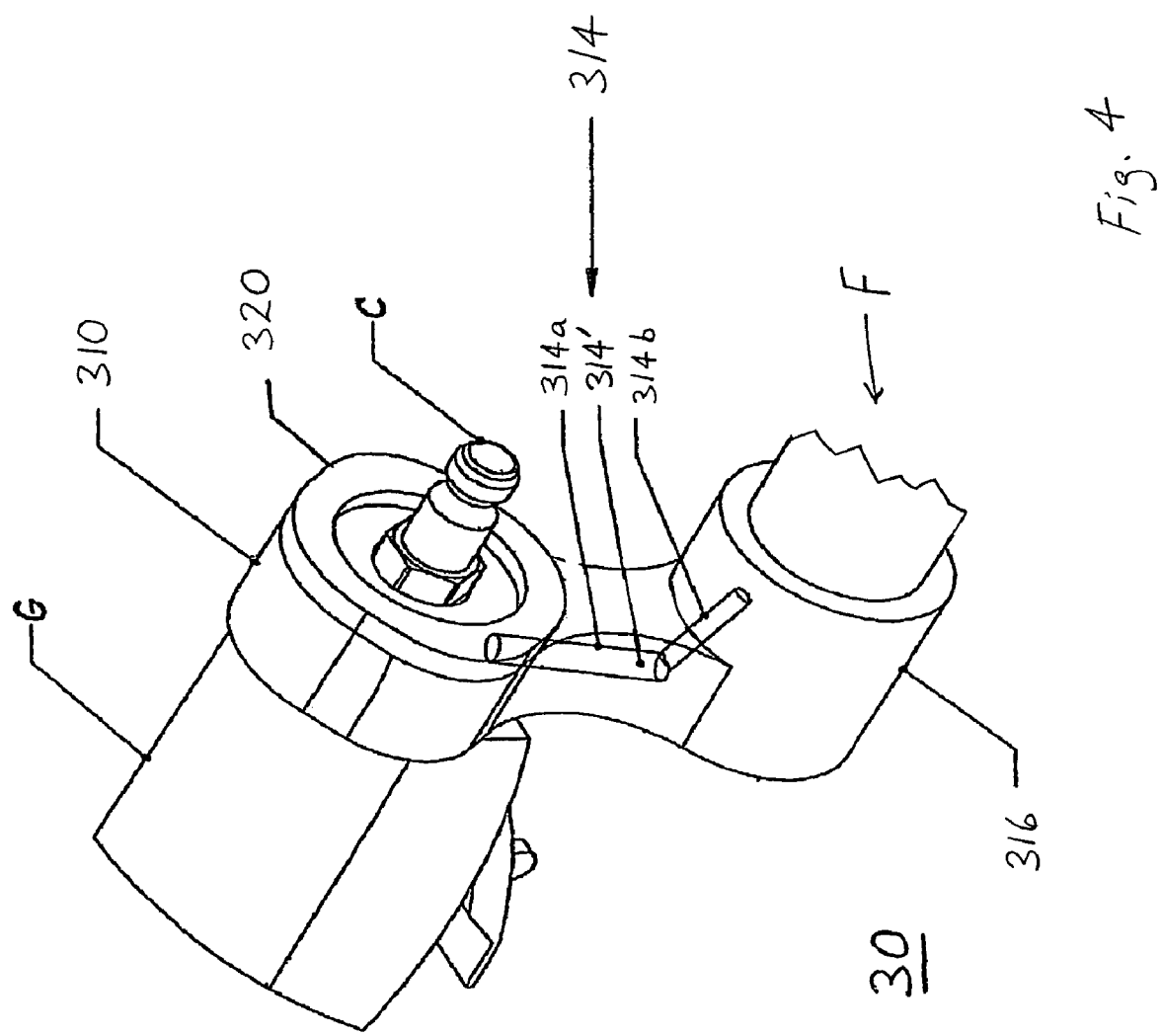
FIG. 4 is a magnified and semi-transparent illustration of the invention as depicted in FIG. 3.

Referring now to FIGS. 3 and 4, there shown is an alternative exemplary embodiment of a universal attachment for capturing and utilizing exhaust gas from pneumatic power tools 30 ("attachment 30"). As depicted, attachment 30 is coupled to an exemplary pneumatic power tool (herein, a conventional grinding wheel G). With additional reference to FIG. 3, attachment 30 comprises an outer sleeve housing 300, an inner sleeve member 320, and a spring 330 (depicted in FIGS. 6-7).

Outer sleeve housing 300 has several portions: a threadless tool coupling portion 310 in turn having an exhaust gas collection chamber 312 (depicted in FIGS. 6-7, as will be described), a duct portion 314, and an exhaust gas outflow portion 316. As will be described more fully in operation of attachment 30 with a pneumatic power tool, threadless tool coupling portion 310 is capable of connection to an exhaust port of the power tool such that exhaust air from the tool is captured therewithin. Coupling portion 310 also provides access to a conventional air supply coupling C of the pneumatic power tool. Exhaust gas outflow portion 316 is capable of connection to a secondary function device F, providing a function, for example, of blowing, audibly muffling, or vacuuming, as may be desired.

Upon close examination of FIG. 4, it may be understood that duct portion 314 of outer sleeve housing 300 includes a duct 314' having two components, 314a and 314b. Duct 314' forms a continuous venturi-like flow conduit through duct portion 314, and provides exhaust gas flow from threadless tool coupling portion 310 and exhaust gas collection chamber 312, to exhaust gas outflow portion 316. Preferably, duct component 314a is vertically oriented through duct portion 314, while duct component 314b is provided at a relative angle of about 20° above horizontal. Further, component 314a has a preferred diameter of about 0.1875 in., while the diameter of component 314b is about 0.125 in.

Outer sleeve housing 300 including its aforementioned several portions, along with inner sleeve member 320, are each preferably fabricated from a stock plastic-like material such as the aforementioned MAKROBLEND ® material.

In a preferred embodiment, housing 300 has an overall length of about 4.25 in. Correspondingly, threadless tool coupling portion 310 has dimensions of about 2.0 in. by 0.75 in., duct portion 314 is about 1.0 in. by 0.75 in., and exhaust gas outflow portion 316 is about 1.25 in. by 1.50 in.

Figure 7:
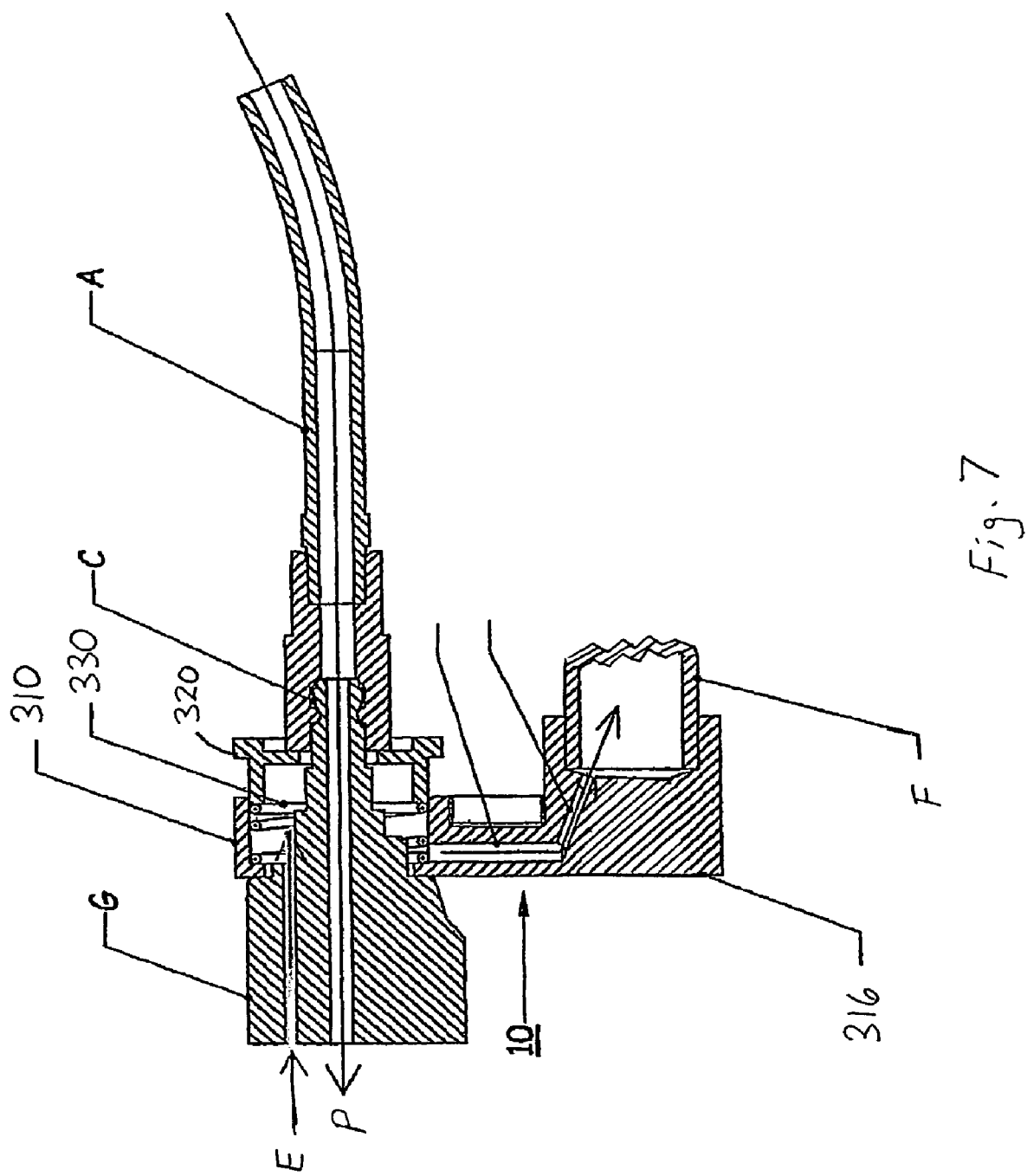
FIG. 7 is a partial cross-sectional illustration of the invention as depicted in FIG. 3, shown as being coupled to a pneumatic tool in operation thereof.

Referring, now, to FIG. 7, attachment 30 is depicted as being in use with a conventional pneumatic power tool G. Threadless tool coupling portion 310 of outer sleeve housing 300 is securely held against the tool and encompasses the tool's exhaust gas E port (depicted in FIG. 7) proximate to conventional air supply coupling C. This is accomplished by way of coupling conventional gas supply line assembly A, placed against inner sleeve member 320, to coupling C, with inner sleeve member 320 acting in cooperation with spring 330 as may be appreciated upon close examination of FIGS. 6 and 7. In this arrangement, spring 330 acts with inner sleeve member 320 to "universally" accommodate use of attachment 30 with various makes and models of pneumatic power tools. Specifically in FIG. 7, it may be seen that upon connection of gas supply line assembly A to coupling C in a conventional manner, assembly A forcibly abuts inner sleeve member 320. In turn, member 320 compresses spring 330, which acts to secure threadless tool coupling portion 310 to the tool. It is to be particularly understood that threadless tool coupling portion 310, in concentric cooperation with spring 330 and telescoping inner sleeve member 320, together provide a universal and substantially airtight connection between housing 300 of attachment 30 among pneumatic power tools having couplings C of various lengths and other dimensions.

As described with respect to attachment 10, Spring 330 may be any suitable wire spring that is operable within, preferably, a 1.5 in. bore, and having a linear working range of about 0.1875 in. to 0.75 in. Spring 330 also preferably has a wire diameter range of about 0.08-0.09 in.

Analogous to the foregoing description of attachment 10 in use, as a stream of exhaust gas E from the tool in operation flows from its exhaust port, threadless tool coupling portion 310 acts to collect and confine the stream of exhaust gas E within exhaust gas collection chamber 312. Sufficient pressure builds therein to force the exhaust gas E through duct components 314a-314b. The effectively pressurized stream of gas E is then forcibly blown from exhaust gas outflow portion 316 into the secondary function device F. It is to be appreciated that, in but one example of use of attachment 30, this relatively high velocity stream of exhaust gas may be utilized to create an upstream vacuum in device F.

While the present invention has been particularly shown and described with reference to the accompanying figures, it will be understood, however, that other modifications thereto are of course possible, all of which are intended to be within the true spirit and scope of the present invention. It should be appreciated that components of the invention aforedescribed may be substituted for other suitable components for achieving desired results, or that various accessories may be added thereto.

Of course, although shown and described in exemplary use with a grinding wheel, an attachment constructed in accordance with the present invention in preferred or alternative embodiments may be readily utilized with virtually any make and model of pneumatic power tool.

Regardless of a given embodiment of the present invention, it is to be particularly appreciated and understood that the invention may be easily utilized to harness exhaust gas from virtually any conventional pneumatic tool, which would otherwise be expelled to the atmosphere, to provide any number of desired secondary functions, e.g., audibly muffling, blowing, or vacuuming.

It is to be appreciated from the drawings and above specification that the novel combination of the two sleeves, the spring between them, and the threadless coupling of the outer sleeve to the tool by way of connection of the gas line to the tool, results in a generally airtight seal about the exhaust port of the tool and thereby enables the function of the universal attachment.

It is to be further appreciated by those of ordinary skill in the pneumatic tool arts that the attachment of the present invention may be easily installed and removed without need for special tooling or tool-specific accessories.

It is also to be understood in general that any suitable alternatives may be employed to provide the universal attachment for capturing and utilizing exhaust gas from pneumatic power tools of the present invention. For example, the various sleeve components may take the form of any compatible shapes, as may be desired for particular uses.

Lastly, of course, the choice of compositions, sizes, and strengths of various aforementioned components of the present invention are all a matter of design choice depending upon intended uses thereof.

Accordingly, these and other various changes or modifications in form and detail of the present invention may also be made therein, again without departing from the true spirit and scope of the invention as defined by the appended claims.

I claim:

1. A universal attachment for capturing and utilizing exhaust gas from pneumatic power tools, the power tools having a conventional pressurized gas line connection and a conventional exhaust gas port, said attachment comprising:

an inner sleeve member, said member being configured to accommodate a conventional gas line assembly there against;

an outer sleeve housing having (i) a threadless tool coupling portion, in turn having an exhaust gas collection chamber, (ii) a duct portion, and (iii) an exhaust gas outflow portion, said duct portion having a duct provided from said exhaust gas collection chamber of said threadless tool coupling portion to said exhaust gas outflow portion, with said threadless tool coupling portion of said outer sleeve housing being configured to accommodate said inner sleeve member therewithin; and at least one spring disposed between said inner sleeve member and said threadless tool coupling portion of said outer sleeve housing, wherein in use with one of said tools, said outer sleeve housing of said attachment is securely held against the tool by way of coupling the conventional gas line assembly, placed against said inner sleeve member, to the conventional pressurized gas line connection of the tool, with said threadless tool coupling portion encompassing the conventional exhaust gas port of the tool such that exhaust gas from the tool is blown (i) into said exhaust gas collection chamber, (ii) through said duct portion, and finally (iii) out from said exhaust gas outflow portion, thereby harnessing the exhaust gas for a secondary function.

2. The universal attachment for capturing and utilizing exhaust gas from pneumatic power tools of claim 1, wherein said inner sleeve member and said threadless tool coupling portion of said outer sleeve housing are each generally cylindrical.

3. The universal attachment for capturing and utilizing exhaust gas from pneumatic power tools of claim 2, wherein said secondary function is selected from the group consisting of blowing, vacuuming, and audibly muffling.

4. The universal attachment for capturing and utilizing exhaust gas from pneumatic power tools of claim 1, wherein said inner sleeve member and said threadless tool coupling portion of said outer sleeve housing are each of a selected compatible shape.

5. The universal attachment for capturing and utilizing exhaust gas from pneumatic power tools of claim 4, wherein said secondary function is selected from the group consisting of blowing, vacuuming, and audibly muffling.

6. The universal attachment for capturing and utilizing exhaust gas from pneumatic power tools of claim 1, wherein said secondary function is selected from the group consisting of blowing, vacuuming, and audibly muffling.

* * * * *